United States Patent

Duguay et al.

[15] 3,675,154

[45] July 4, 1972

[54] DISPERSION COMPENSATION IN LASERS

[72] Inventors: Michel Albert Duguay, Summit; John Wilfred Hansen, North Plainfield, both of N.J.

[73] Assignee: Bell Telephone Laboratories, Incorporated, Murray Hill, Berkeley Heights, N.J.

[22] Filed: Oct. 1, 1970

[21] Appl. No.: 77,228

[52] U.S. Cl............................................331/94.5, 356/112
[51] Int. Cl.........................................H01S 3/00, G01b 9/02
[58] Field of Search..................................331/94.5

[56] References Cited

UNITED STATES PATENTS 3,551,034   12/1970   Tournois et al.........................350/321

OTHER PUBLICATIONS

" Compression of Optical Pulses," IEEE Journal of Quantum Electronics, QE-4, Giordmaine et al., pp. 252– 255.

*Primary Examiner*—Ronald L. Wibert
*Assistant Examiner*—Conrad Clark
*Attorney*—R. J. Guenther and Arthur J. Torsiglieri

[57] ABSTRACT

The normal dispersion of a solid state active laser medium is compensated for by means of an intracavity multireflection device such as a pair of spaced parallel diffraction gratings or a Gires-Tournois interferometer.

12 Claims, 6 Drawing Figures

Patented July 4, 1972

INVENTORS M.A. DUGUAY
J.W. HANSEN
BY Michael J. Urbano
ATTORNEY

DISPERSION COMPENSATION IN LASERS

BACKGROUND OF THE INVENTION

This invention relates to lasers and, more particularly, to the compensation of the normal dispersion in solid state laser media.

Dispersion is a phenomenon which causes radiation in a range of frequencies to experience frequency dependent time delays and may be characterized as either positive (normal) or negative depending, respectively, on whether higher frequencies are delayed more than lower frequencies or vice versa. This phenomenon may be dramatically observed in an optical pulse containing radiation components in the visible portion of the spectrum. Positive dispersion, such as that produced by a glass rod, causes the leading edge of the pulse to be red (lower frequency, less delay) and the trailing edge to be blue (higher frequency, more delay).

Accompanying this dispersive effect, however, are a number of problems. In the instance of a mode-locked Nd:glass laser, for example, the lower limit on the pulse width of the pulses generated, typically about 3–20 picoseconds, is due primarily to positive dispersion in the glass rod which by delaying different frequency components by different amounts causes the pulse to "spread out" in time. This effect is undesirable in optical PCM communications systems in which the pulse train is the carrier. In such systems it is desirable that the pulse width be as small as possible in order to increase information carrying capacity.

Semiconductor active media also exhibit normal dispersion which causes the longitudinal mode separation frequency to be nonuniform, thereby seriously hampering the attainment of conventional longitudinal mode locking. The solution of this problem is the subject matter of copending patent application Ser. No. 77,136 of T. L. Paoli and J. E. Ripper (Case 8–9) filed concurrently herewith and assigned to applicants' assignee.

It is therefore one object of the present invention to compensate for the dispersion inherent in a solid state active laser medium.

It is another object of this invention to reduce the pulse width of optical pulses generated by solid state lasers.

SUMMARY OF THE INVENTION

These and other objects are accomplished in accordance with an illustrative embodiment of the invention in which the inherent dispersion of a solid state active laser medium is compensated for by means of an intracavity multireflection device, such as a pair of spaced parallel diffraction gratings or a Gires-Tournois interferometer, the parameters of which are adjusted to introduce compensating dispersion, substantially equal in magnitude, but opposite in sign, to that inherent in the medium.

Other embodiments employing over-compensation followed by successive amplifying stages of the dispersive active medium are also described.

BRIEF DESCRIPTION OF THE DRAWING

These and other objects of the invention, together with its various features and advantages, can be more easily understood from the following more detailed description taken in conjunction with the accompanying drawing, in which.

DETAILED DESCRIPTION

Before discussing the invention in detail, a brief discussion of two types of multireflection dispersive structures used herein will be presented.

Figure 1:
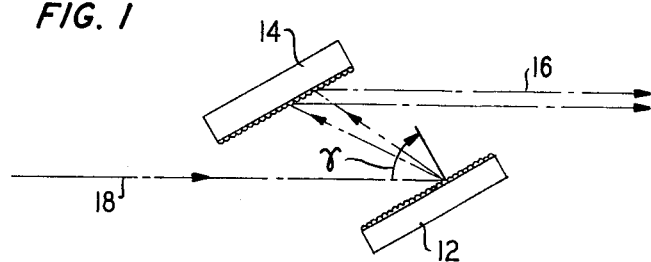
FIG. 1 is a schematic of a pair of spaced parallel diffraction gratings.

One type of dispersive structure, as shown in FIG. 1, comprises a pair of spaced, parallel, matched diffraction gratings 12 and 14 disposed so that radiation reflected from one grating is incident upon the other. In such a double grating arrangement, each frequency component follows a unique path which is determined by the diffraction conditions, the consequent variation of path length being a function of frequency. Over a relatively wide frequency band, typically about 150 THz, this arrangement provides a frequency dependent time delay, i.e., lower frequency components of incident radiation undergo larger diffraction angles, traverse longer paths and hence undergo longer delays, and vice versa. In addition, after being diffracted by the two identical and parallel gratings 12 and 14, the beam 16 emerges parallel to its original direction 18 but spatially separated in parallel paths. By returning the light over the same path after reflection from a mirror (see FIG. 5), the delay is doubled and the spatial separation is removed.

In such a dispersive structure, compensation for the inherent dispersion of an active medium occurs when $$\frac{dg}{d\nu} = -\frac{4\pi^2 cb}{(2\pi\nu)^3 d^2}\left[1 - \left(\frac{c}{\nu d} - \sin\gamma\right)^2\right]^{-3/2} \quad (1)$$

where the right hand side of equation (1) is the group delay dispersion of the grating pair and $dg/d\nu$ = group delay dispersion in traversing an active medium in both the forward and backward directions $g$ = group delay $\nu$ = the center frequency of the laser radiation $c$ = the speed of light in the medium $\gamma$ = angle of incidence of the beam on the grating $d$ = ruling spacing of the gratings $b$ = distance along a light ray measured between the gratings.

For example, consider a grating pair each having 300 lines/mm ($d = 1/300$ mm) and an angle of incidence $\gamma = 60°$. The group delay dispersion per pass at $\lambda = 1.06\mu$ ($\nu = 283$ THz) is given by $$\frac{dg}{d\nu} = -3.25 \frac{f\sec}{THz} \cdot b \quad (2)$$

where *fsec* and *THz* correspond, respectively, to fentoseconds ($10^{-15}$ sec) and terahertz ($10^{12}$Hz). To compensate for the dispersion of a 10 cm long glass rod (e.g., a Nd:glass laser rod) which has $$\frac{dg}{d\nu} = +30 \frac{f\sec}{THz},$$

, then the gratings should be separated by a distance approximately equal to $b = 4.61$ cm. Under these conditions, the grating pair produces a negative dispersion of $-15$ fsec/THz per pass or $-30$ *fsec/THz* per round trip. To over-compensate, for purposes to be described subsequently, then $b$ is taken to be about 6 cm in which case $dg/d\nu = -19.5$ *fsec/THz* per pass.

Figure 2A:
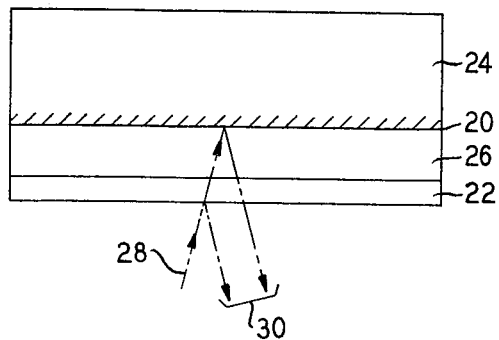
FIG. 2A is a schematic of a Gires-Tournois interferometer in thin film form.

Another type of dispersive structure, which provides a larger time delay range (by factor of about 100) than the double grating arrangement, is a short interferometer of the type described by F. Gires and P. Tournois in *Compt. Rend*, 258, 6,112 (1964) comprising (as shown in FIG. 2A) a pair of parallel mirrors or reflecting surfaces 20 and 22 of different reflectivity. A high reflectivity mirror 20, ideally 100% reflectivity at the center frequency of incident radiation, faces a mirror 22 of intermediate reflectivity, typically 50%, which serves as an optical input-output face. In thin film form, surface 20 typically comprises a metallic or dielectric coating deposited on a substrate 24 (e.g., glass), whereas partially reflective, partially transmissive layer 22, about one quarter wavelength thick at the center frequency, is separated from surface 20 by a transparent intermediate layer 26. Layers 22 and 26 are also typically dielectrics such as thorium oxide, for example.

Figure 2B:
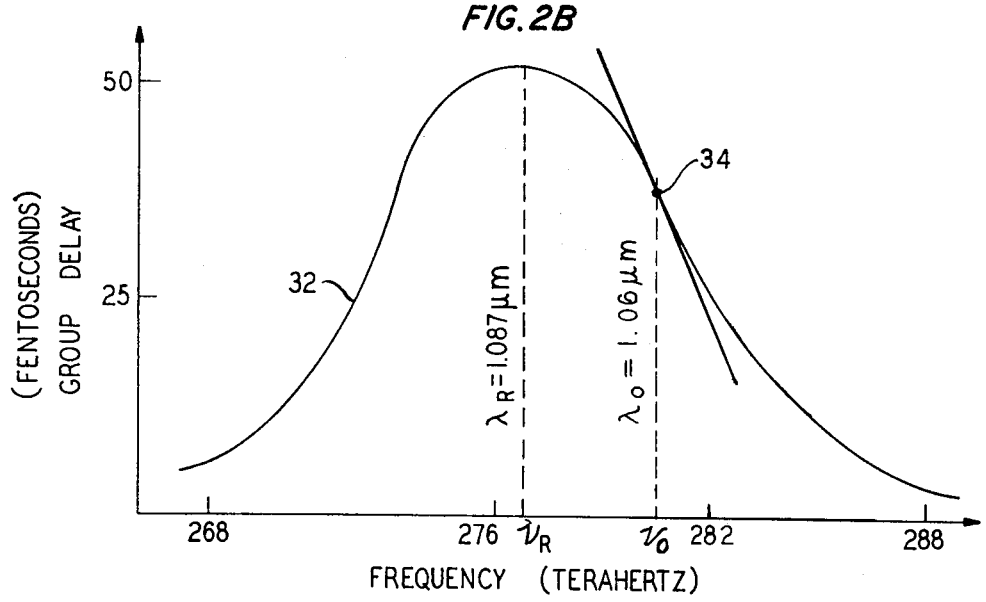
FIG. 2B is a graph of a portion of the dispersive characteristic of a Gires-Tournois interferometer.

In operation, a wave 28 which impinges upon a Gires-Tournois interferomter (GTI) is partially reflected each time it strikes partially reflecting surface 22 and is substantially completely reflected each time it strikes high reflectivity surface 20. The output 30 is therefore, a superposition of differently phased segments of the input wave 28; the net effect is a frequency dependent time delay of the input wave. Overall the time delay is periodic in frequency, one period being shown in FIG. 2B. The periodicity is equal to $2e/c$ where $e$ is the spacing between the mirrors and $c$ is the speed of light. In certain restricted frequency bands (e.g., region 34 of curve 32 shown to be about 5 $THz$ wide) however, the delay is substantially linear in frequency. These frequency bands can be broadened (e.g., to about 50 $THz$) by decreasing the spacing $e$.

The dispersion of the GTI is adjusted by varying the spacing between mirrors 20 and 22. Thus, to compensate for normal or positive dispersion in an active medium, the GTI is adjusted so that the laser center frequency (e.g., $\nu_0 = 282\ THz;\ \lambda_0 = 1.06\ \mu m$ for a Nd:glass laser) falls on the high side of a GTI resonance peak shown to occur at a frequency $\nu_R$ ($\lambda_R = 1.087\ \mu m$) in FIG. 2B. Operation under these conditions introduces negative dispersion which compensates for the positive dispersion of the active medium.

It has been found that for practical design purposes the power reflectivity of input mirror 22 should preferably be about 25 percent. Under this condition the group delay dispersion is given by $$\frac{dg}{d\nu} = -5\frac{fsec}{THz}\left(\frac{e}{2.66}\right)^2 T_\nu(e) \qquad (3)$$

where $g$ = group delay per reflection
$\nu$ = optical frequency
$e$ = optical path length separating mirrors 20 and 22
$T_\nu(e)$ = tuning factor varied typically between 0.5 and 1.0 by making small (fractions of one micron) changes in $e$.

Assume again, for example, that it is desired to compensate for the normal dispersion of +30 $fsec/THz$ in a 10 cm long glass rod. A GTI, constructed such that $T_\nu(e) = 1.0,\ e \approx 2.66\ \mu m$ and such that incident radiation undergoes six reflections between mirrors 20 and 22, produces $-5\ fsec/THz \times 6 = -30\ fsec/THz$ of negative dispersion, thereby resulting in net zero dispersion.

As before, more reflections, say ten, over-compensate for the positive dispersion of the glass rod and result in a net negative dispersion and a down-chirped pulse which can be later compensated for by passage through a normally dispersive medium, e.g., another glass rod or even water.

In order to increase the time delay, the wave may be repeatedly passed through the GTI by means of a third high reflectivity mirror, the GTI may be made longer or, as will subsequently be described, a pair of oppositely facing GTI's may be utilized.

Figure 3:
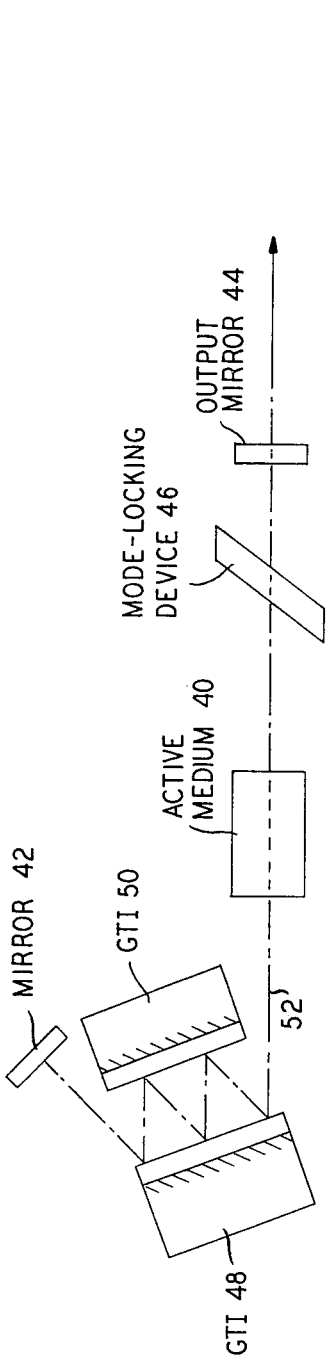
FIG. 3 is a schematic of one embodiment of the invention using a Gires-Tournois interferometer.

An embodiment utilizing such a pair of GTI's is shown in FIG. 3. A laser includes a solid state active medium 40 disposed in a resonator formed by a highly reflecting (e.g., ideally 100 percent reflectivity) mirror 42 and a partially transmissive e.g., 50 percent reflectivity) output mirror 44. The laser is mode-locked by means of a well known intracavity mode-locking device 46, e.g., a saturable dye such as Eastman Kodak 9,860 or a synchronous modulator driven at the longitudinal mode separation frequency. Also disposed within the resonator are a pair of oppositely facing GTI's 48 and 50 tilted with respect to the resonator axis. Consequently, when the beam 52 strikes GTI 48 obliquely, it is reflected therefrom to incidence on GTI 50 and thence back to GTI 48 and so on until the beam emerges from the other end of the GTI pair and strikes mirror 42 at normal incidence to be reflected back upon itself. In both the forward and backward directions and at each reflection from each GTI, the components of the laser beam, which constitutes a pulse train, undergo frequency dependent time delays. If the GTI's are properly adjusted, these time delays will compensate for the normal dispersion of the active medium, thereby resulting in narrower pulse widths.

Consider, for example, that the foregoing laser is a mode-locked Nd:glass laser which generates pulses of width ranging from 3–20 psec (picoseconds) depending on the precise laser parameters chosen. In the laser glass medium at 1.06 $\mu m$ the delay dispersion is about 30 $fsec/THz$ for a 10 cm long glass rod i.e., +0.9 psec per 100 $cm^{-1}$ per meter of glass). The GTI previously described has a maximum negative dispersion of $-5.0\ fsec/THz$ per reflection. For a 10 cm Nd:glass rod, the arrangement of FIG. 3, when adapted to produce a total of six reflections from both GTI's compensates for the dispersion of the glass rod; i.e., the six reflections from the GTI's produce about $6 \times (-5)\ fsec/THz = -30\ fsec/THz$ which cancels the +30 $fsec/THz$ of the glass rod.

As a result of this form of dispersion compensation, termed a zero-dispersion mode of operation, it is possible to obtain optical pulses having durations of a fraction of a picosecond.

Figure 4:
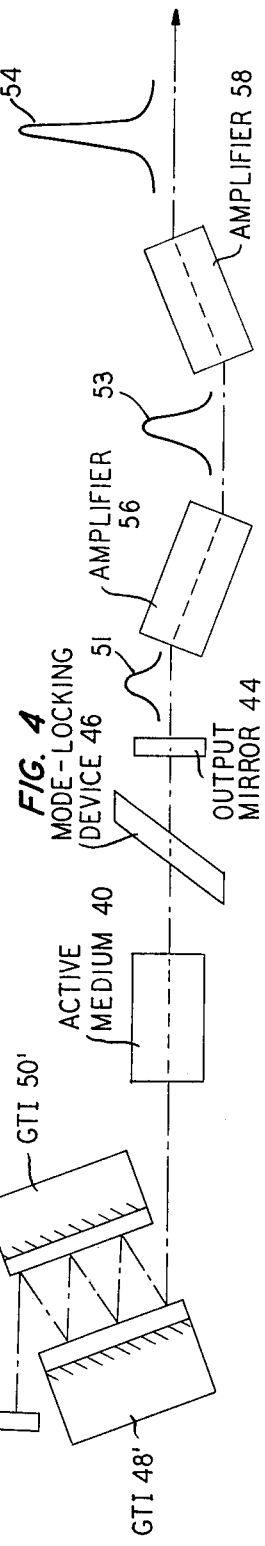
FIG. 4 is a schematic of another embodiment of the invention using a Gires-Tournois interferometer.

It may be desirable for some applications, however, to over-compensate for the inherent dispersion of the active medium and thereby operate in what is termed a negative dispersion mode. Such a mode of operation is shown in FIG. 4 where the output pulse 51 of the mode-locked Nd:glass laser is to be amplified by tandem glass rods 56 and 58 which also have inherent normal (positive) dispersion. In this mode, the GTI's 48' and 50' are arranged to provide more reflections than necessary to compensate for the dispersion of glass rod 40 thereby to produce a net negative dispersion. Consequently, the output pulse 51 is broadened to about 3 psec, for example, instead of being narrowed as above. That is, the output pulse is down-chirped, having a blue leading edge and a red trailing edge. This negative dispersion characteristic is cancelled, however, by passing the pulse 51 successively through amplifying rods 56 and 58. Thus, rod 56 having a positive dispersion compresses pulse 51, thereby narrowing it to 1 psec duration, for example, as well as amplifying it as shown at 53. Similarly, rod 58 further compresses and amplifies the pulse 53 to generate an output pulse 54 of about 0.3 psec duration, for example.

Figure 5:
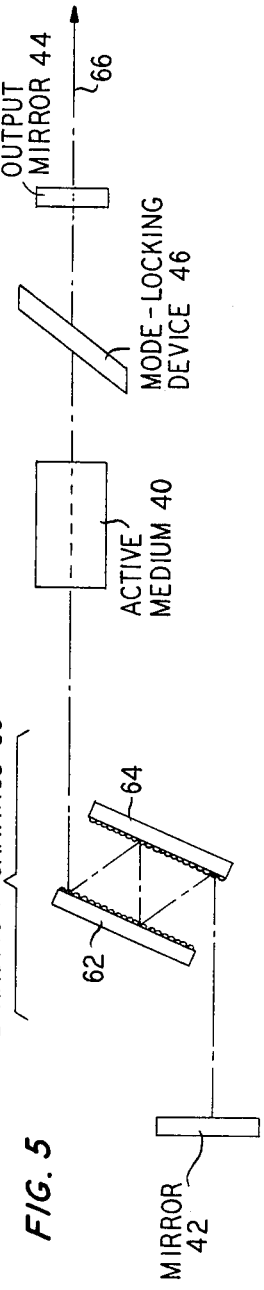
FIG. 5 is a schematic of an embodiment of the invention utilizing diffraction gratings.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, as shown in FIG. 5, the pair of GTI's may be replaced by an intracavity pair 60 of parallel diffraction gratings for operation in either a zero dispersion mode or in a negative dispersion mode as previously discussed. In this embodiment, radiation from active medium 40 is obliquely incident upon grating 62 from which it is reflected to incidence upon grating 64, back to grating 62 and so on until the beam emerges to normal incidence upon high reflectivity mirror 42. For simplicity the spatial separation produced by the grating pair has been omitted from the drawing. Consequently, radiation traversing the grating pair 60 undergoes negative dispersion which compensates for the positive dispersion of medium 40, thereby resulting in narrow pulse widths in the output pulse train at 66.

What is claimed is:

1. Laser apparatus including an optical cavity resonator,
   an active medium disposed within said resonator,
   means for pumping said medium to produce stimulated coherent radiation within a range of optical frequencies,
   means for coupling out of said resonator radiation in the form of optical pulses, said medium being disadvantageously characterized by the dispersive property that radiation at higher frequencies within said range undergoes different time delays than radiation at lower frequencies within said range, and characterized by multiple-reflection means disposed within said resonator for compensating said dispersive property so that radiation at substantially all frequencies within said range undergoes substantially the same time delay.

2. The laser apparatus of claim 1 wherein said active medium is characterized by positive dispersion whereby radiation at higher frequencies within said range undergoes longer time delays than radiation at lower frequencies within said range and said multiple-reflection means is characterized by negative dispersion whereby radiation at higher frequencies within said range undergoes shorter time delays than radiation at lower frequencies within said range.

3. The laser apparatus of claim 2 wherein said multiple reflection means comprises at least one Gires-Tournois interferometer.

4. The laser apparatus of claim 3 wherein said interferometer is characterized by a periodic time delay versus frequency characteristic including within each period substantially linear portions having both positive and negative slopes, said interferometer being adapted so that the center frequency of said laser radiation coincides with a substantially linear negative slope portion within one of said periods.

5. The laser apparatus of claim 4 wherein said interferometer comprises a first mirror of high reflectivity and a second mirror of intermediate reflectivity in spaced parallel relation with said first mirror, the power reflectivity of said second mirror being approximately 25 percent and wherein said interferometer is constructed to satisfy approximately the following relationship $$\frac{dg}{d\nu} = -5 \frac{f\sec}{\text{THz}} \left(\frac{e}{2.66}\right)^2 T_\nu(e)$$

where $g$ is the group delay per reflection of said radiation from said interferometer, $\nu$ is the optical frequency of said laser radiation; $e$ is the optical path length separating said mirrors and $T_\nu(e)$ is a tuning factor varied between about 0.5 and 1.0.

6. The laser apparatus of claim 3 including a second Gires-Tournois interferometer in spaced parallel relation with said one interferometer, said interferometers being obliquely disposed with respect to the axis of said resonator so that said radiation undergoes multiple reflections between said interferometers.

7. The laser apparatus of claim 2 wherein said multiple reflection means comprises a first diffraction grating disposed at an oblique angle with respect to the axis of said resonator, a second diffraction grating, substantially identical to said first diffraction grating, disposed in spaced parallel relation with said first diffraction grating so that said radiation undergoes multiple reflections between said gratings.

8. The laser apparatus of claim 7 wherein said diffraction gratings are constructed to satisfy approximately the following relationship $$\frac{dg}{d\nu} = -\frac{4\pi^2 cb}{(2\pi\nu)^3 d^2} \left[1 - \left(\frac{c}{\nu d} - \sin \gamma\right)^2\right]^{-3/2}$$

where $dg/d\nu$ is the group delay dispersion of said radiation in traversing said active medium in both the forward and backward directions, $g$ is the group delay, $\nu$ is the optical center frequency of said radiation, $c$ is the speed of light in said medium, $\gamma$ is the angle of incidence of said radiation on one of said gratings, $d$ is the ruling spacing of said gratings, and $b$ is the distance along a radiation path measured between said gratings.

9. The laser apparatus of claim 8 wherein said angle of incidence is approximately 60°.

10. The laser apparatus of claim 2 wherein the longitudinal modes of said radiation within said resonator are phased-locked.

11. The laser apparatus according to claim 2 wherein said multiple reflection means overcompensates for said positive dispersion of said active medium, thereby to produce within said resonator a net negative dispersion in the pulsed radiation coupled out of said resonator so that radiation at higher frequencies undergoes less time delay than radiation at lower frequencies, and in combination with extra-cavity positive dispersion means disposed in the path of said coupled radiation for compensating the negative dispersion therein.

12. The laser apparatus of claim 11 wherein said positive dispersion means comprises a body of material substantially the same as the material of said active medium.

* * * * *